United States Patent [19]

Kruse

[11] 4,296,589
[45] Oct. 27, 1981

[54] PACKAGING MACHINE WITH CAM-OPERATED CUTTER AND CONTAINER SUPPORTS THEREFOR

[75] Inventor: Gary L. Kruse, Spring Lake, Mich.

[73] Assignee: Dake Corporation, Division of JSJ Corporation, Grand Haven, Mich.

[21] Appl. No.: 69,100

[22] Filed: Aug. 23, 1979

Related U.S. Application Data

[63] Continuation-in-part of Ser. No. 904,216, May 9, 1978, Pat. No. 4,196,561.

[51] Int. Cl.³ .......................... B65B 7/28; B65B 41/16
[52] U.S. Cl. ........................................ 53/300; 53/298;
53/389; 83/352; 83/297; 156/522; 198/793
[58] Field of Search ................. 53/296, 297, 298, 329,
53/373, 389, 300, 282; 83/352, 350, 285, 297,
308; 198/648, 793, 341; 156/510, 522, 552, 583

[56] References Cited

U.S. PATENT DOCUMENTS

| | | | |
|---|---|---|---|
| 563,252 | 7/1896 | Bensing | 83/308 X |
| 719,722 | 2/1903 | Bechtel | 198/25 |
| 853,858 | 5/1907 | Bechtel | 198/25 |
| 2,648,183 | 8/1953 | Dalton | 53/389 |
| 2,811,933 | 11/1957 | Prasz | 107/8 |
| 3,040,874 | 6/1962 | Lyman | 198/181 |
| 3,246,734 | 4/1966 | Carvallo | 198/189 |
| 3,436,894 | 4/1969 | Sorensen | 53/37 |
| 3,457,699 | 7/1969 | Kinney et al. | 53/373 |
| 3,490,196 | 1/1970 | Sorensen | 53/389 X |
| 3,553,930 | 1/1971 | Anderson et al. | 53/329 X |
| 3,587,829 | 6/1971 | Sorensen | 198/131 |
| 3,590,973 | 7/1971 | Sorensen | 198/25 |
| 3,625,338 | 12/1971 | Cawley | 198/35 |
| 3,706,175 | 12/1972 | Anderson et al. | 53/329 X |
| 3,706,183 | 12/1972 | Talarico | 53/329 |
| 3,851,445 | 12/1974 | Schuh | 53/329 |
| 3,975,887 | 8/1976 | Clymer | 53/373 |
| 4,056,922 | 11/1977 | Schilte | 53/373 |

FOREIGN PATENT DOCUMENTS 596287 4/1934 Fed. Rep. of Germany.
217432 6/1924 United Kingdom.
417800 10/1934 United Kingdom.

OTHER PUBLICATIONS

Photographs of North American Paper Co., Packaging Machine Model ARPS, Chicago, Ill., Sold Apr. 1977.
Acme Chain Div. Rockwell International Catalog, pp. B8 and B9, "Acme Hollow Pin Chain".

Primary Examiner—John E. Kittle
Attorney, Agent, or Firm—Price, Heneveld, Huizenga & Cooper

[57] ABSTRACT

A packaging machine for applying and securing a continuous web of material, especially of the heat sealable type, to containers, especially open-topped containers. The machine includes an intermittently rotatable cutter for severing the web between adjacent container supports. The cutter includes camming means adjacent each end for rotating the cutter with respect to each container support to one position in readiness for further rotation between the container supports to sever the web. Support pins for carrying the container supports may be included on at least one of the supports and conveyor chains. When on the conveyor chains, support pins need be included at only some of the chain joints. The container supports may be molded from a settable material and include a convex, upward curvature to allow proper container sealing under pressure from a web applying device.

14 Claims, 15 Drawing Figures

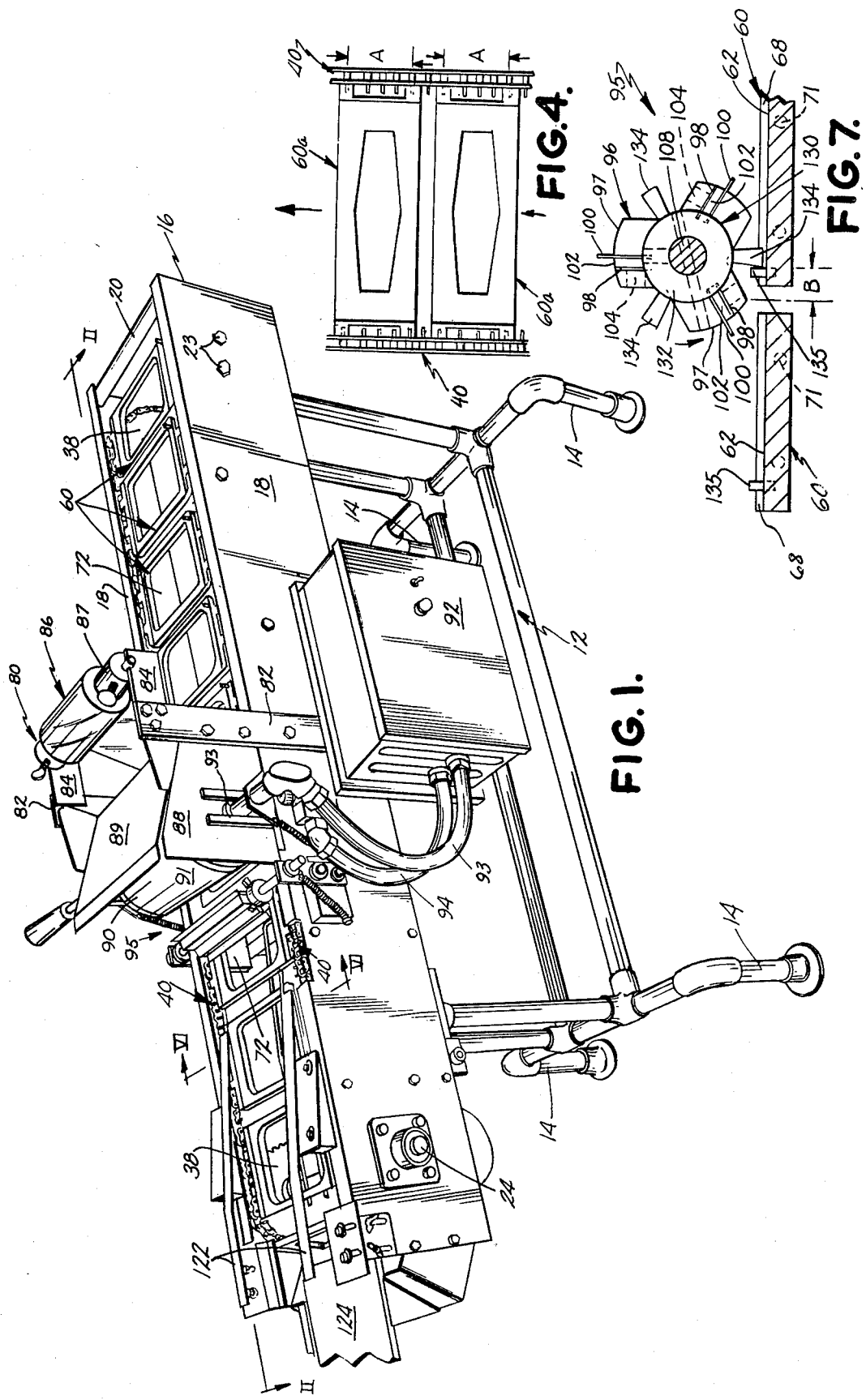

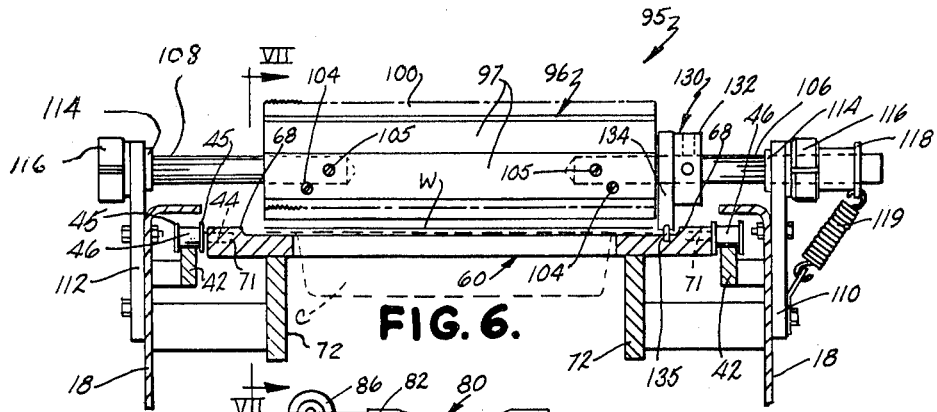

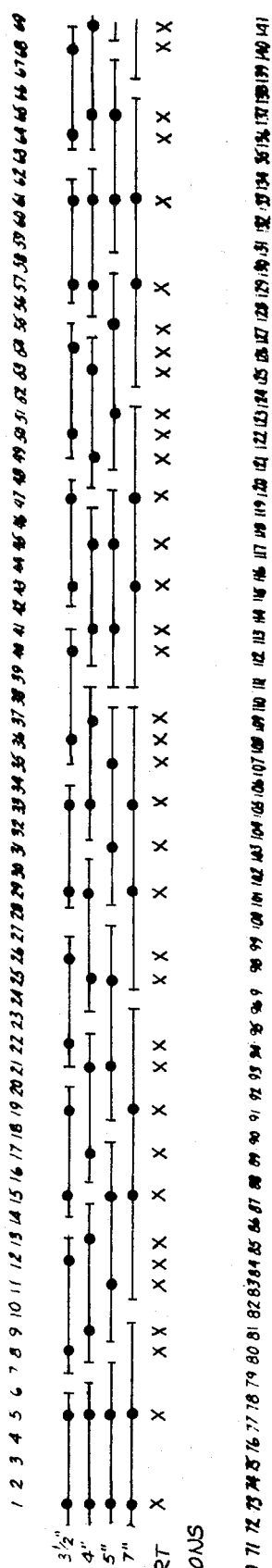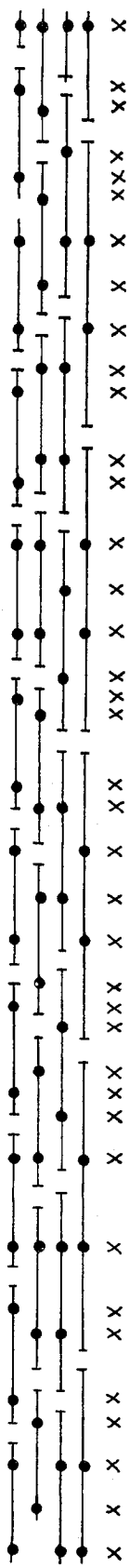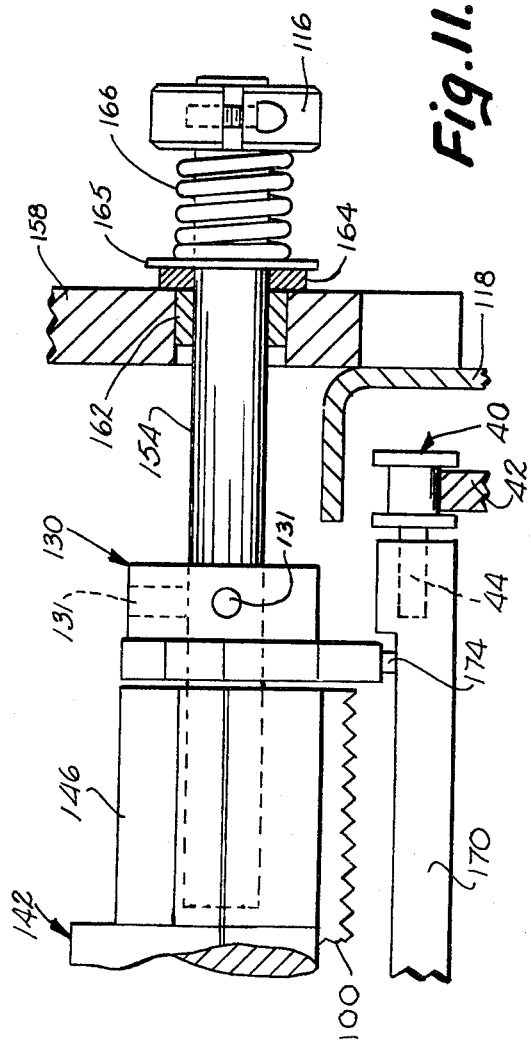
Fig. 15.
Fig. 11.

PACKAGING MACHINE WITH CAM-OPERATED CUTTER AND CONTAINER SUPPORTS THEREFOR

CROSS-REFERENCE TO RELATED APPLICATION

This application is a continuation-in-part of my prior pending application, Ser. No. 904,216, filed May 9, 1978, now issued as U.S. Pat. No. 4,196,561.

BACKGROUND OF THE INVENTION

This invention relates to packaging machines, especially those of the type designed to apply and secure a web of material to containers, to cutting mechanisms for severing the web of material between adjacent containers, as well as to conveyors and container supports for such packaging machines.

It is well known to use a packaging machine to apply a continuous web of heat sealable film or other material to a series of containers supported on a conveyor. In such machines, it is necessary to separate or sever the continuous web of material between adjacent containers after the web has been applied and secured to the container. Various types of severing or cutting devices have been used in the past with such machines with varying success.

One prior known type of cutter includes opposed cutting blades which are reciprocated toward and away from one another in order to shear the web of material at the desired location. Another type of cutter is that shown in U.S. Pat. No. 3,851,445 and includes a slitter which is reciprocated diagonally across a moving conveyor to cut the web of material. A third type of cutter is a continuously rotated cutter such as those shown in U.S. Pat. Nos. 3,436,894 or 3,706,183. With each of the above types of cutting or slitting assemblies, complex timing devices such as belts, chains, gears or extensive levers or the like were necessary to enable the appropriate shearing, slitting or severing action to take place properly between adjacent containers so as to avoid damage to either the container or the web of material secured to the container.

A second problem encountered with the above type of packagers has been the inability or relative difficulty in modifying the packaging conveyor to support different sizes of containers. In the type of packager with which the present invention is concerned, open-topped, formed thermoplastic or paper containers are slipped in apertures in generally horizontally extending plates secured in some fashion to a conveyor which carries them under a web applying and securing structure. As is apparent, various sizes and shapes of containers require different support plates having different sizes or shapes of receiving apertures. In prior packaging machines or conveyors, a change in container supports required substantial time and effort including either changing the conveyor support chains or other supporting devices, separate securement of different size plates with threaded fasteners and support brackets to the prior existing chains, or other time-consuming procedures. This, in itself, was a difficult and laborious operation which often necessitated a packaging concern to purchase two or three different packagers each with its own size container support plates in order to avoid the time-consuming job of changing container supports.

The above changeover problems also resulted in problems with the cutting, shearing or slitting apparatuses for the continuous web material. In prior machines, if the container supports were changed or their locations modified to support different sizes of containers, adjustment and retiming of the cutting apparatus was also necessary. That is, either the chains, gears or levers which timed the shearing, slitting or continuously rotating cutting action of the prior known cutting assemblies had to be changed so that the cutting action occurred at the proper place and time with respect to the new container supports. This, too, added further time and labor expense to the conversion of the packager from one size container support to another.

In addition to the above problems, prior packaging machines utilized web-cutting assemblies which were often very complex and required frequent sharpening or normal maintenance even when the container supports were not changed. This resulted in frequent downtime for the packager and additional expense for repairs.

In my prior application, Ser. No. 904,216, now U.S. Pat. No. 4,196,561, a rotatable cutter was disclosed and claimed including camming means at one end engaging a single projection on each of a plurality of successive container support members for rotating the cutter and distinct blades thereon between successive container support member. It was found that at certain times the cutter assembly would not be sufficiently rotated following severance of the web to allow proper engagement of the camming means with the projection on the next successive container support member. This resulted in machine jamming at certain times.

Also, it was found in the prior packaging machine disclosed in Ser. No. 904,216, wherein container support pins were included at each joint of each conveyor chain, that certain of the conveyor pins could be eliminated thereby reducing the expense of such chains while retaining the ability to provide cutoff of the web at various lengths including the $3\frac{1}{2}$, 4, 5 and 7 inch cutoff lengths used in the packaging industry.

Also, in attempting to reduce the cost of container supports through molding from plastics or other materials, it was discovered that supports formed from settable materials such as moldable plastics were more flexible than prior known metallic container supports. The flexibility of such molded materials caused problems in proper sealing of the web materials to the container tops since the container supports flexed under the pressure of the web applying devices during packaging. Accordingly, proper sealing of the open-top containers with the web applying devices would not result with molded container support embodiments.

The various aspects of the present invention were conceived in recognition of and as solutions for the above problems, as well as improvements for my prior packaging machines.

SUMMARY OF THE INVENTION

Accordingly, the present invention provides a packaging machine for applying and securing a continuous web of material to containers. The machine has interchangeable container supports as well as a cutting or severing assembly which cuts or severs the web between the containers in a simple and efficient manner. The cutting assembly is intermittently rotatable and automatically adjusts to different sizes of container supports without need for any gearing or other changes for timing the cutting action with respect to the different sized container supports. In addition, the packager is uniquely adapted for supporting a range of sizes of container supports and for interchanging those different size container supports quickly and easily without modifying the basic conveyor in any sense. Once changed, the container supports cooperate with the cutting assembly without any adjustment of the cutter being necessary. The cutting assembly rotates intermittently as operated by the container supports thereby eliminating any complex operating mechanisms.

In one form, the invention is a packaging machine for applying and securing a web of material to containers including an intermittently rotatable cutter having at least three fixed cutting edges spaced therearound, camming means at each end of the cutter and offset from each of the cutting edges for rotating the cutter, and a pair of projections on each of the container supports, one projection for engaging each camming means. The projections and camming means first rotate the cutter to bring the cutting edges into a preset, ready position and second rotate the cutting edges smoothly into and out of the spaces between the container supports to sever the web of material.

In another aspect, the packager includes means for interchangeably mounting container supports of different sizes, the included camming and projection means allowing cutting of the web material between the container supports without changing or adjusting the cutter. The interchangeable container support mounting means may be support pins on at least one of the container support themselves or the chains. Similarly, means for receiving the support pins may be included on at least the other of the container supports or the chains. When the pins are included on the chains, certain of the pins may be eliminated so that pins are included at only some of the joints. However, interchangeability of various container support sizes, allowing cutoff at $3\frac{1}{2}$, 4, 5 and 7 inches, is still possible even when some of the pins are eliminated through the use of a specific pin pattern.

In yet another aspect of the invention, molded container support members are formed from a settable material and include a convex, curved top surface which will allow proper web sealing to supported containers therein even when flexed due to pressure applied to the container support member and supported container by web applying devices.

The present invention has numerous advantages over prior known packages and cutting assemblies for packagers. The intermittently, rotatable cutter is simply designed and easily maintainable and requires little or no attention during use. Means for intermittently rotatably camming the cutter are separately adjustable from the cutter should any initial adjustment be necessary. Jamming of the conveyor and improper positioning of the cutter is prevented. In addition, the blades of the cutter are easily changed to further reduce packager downtime. The conveyor for the packager allows rapid interchanging of the container supports. The chain including pins extending inwardly at some joints or at each joint allows a wide range of sizes of container supports to be mounted. Pins may also be included on at least one of the container supports or chain. The various sizes of container supports all cooperate well with the cutter to intermittently rotate the same without adjustment when changes are made. Although the spacing between the various sizes of container supports differs when the supports are changed, the intermittently, rotatable cutter easily accommodates a range of such spaces to avoid need for adjustment. Also, less expensive, molded container supports which allow proper container cover or web sealing are useful with the packager.

These and other objects, advantages, purposes and features of the invention will become more apparent from a study of the following description taken in conjunction with the drawings.

BRIEF DESCRIPTION OF THE DRAWINGS

FIG. 1 is a front, perspective view of the packaging machine incorporating the present invention;

FIG. 2 is a fragmentary, side elevation of the packaging machine of FIG. 1 with portions broken away to illustrate support of the conveyor chain;

FIG. 3 is a fragmentary, plan view of area III—III of FIG. 2 showing the packaging conveyor, the container supports and conveyor chain included therein;

FIG. 4 is a fragmentary, plan view of the same area of the packaging conveyor shown in FIG. 3 but with different container supports inserted between the supporting conveyor chains;

FIG. 5 is a fragmentary, perspective view of the intermittently rotatable, web-cutting assembly of the present invention;

FIG. 6 is a sectional, end elevation of the cutting assembly area of the packaging machine taken along plane VI—VI of FIG. 1;

FIG. 7 is a sectional, end elevation of the cutting assembly area of the packaging machine taken along plane VII—VII of FIG. 6;

FIG. 11 is an enlarged, fragmentary, sectional end elevation of an end portion of the cutting assembly of FIG. 8;

FIG. 15 is a schematic illustration of the required pin locations for providing double support pins at each end of each container support member to carry varying sized container support members for $3\frac{1}{2}$, 4, 5 and 7 inch cutoff lengths while eliminating all unnecessary pin locations.

DESCRIPTION OF THE PREFERRED EMBODIMENTS

Figure 8:
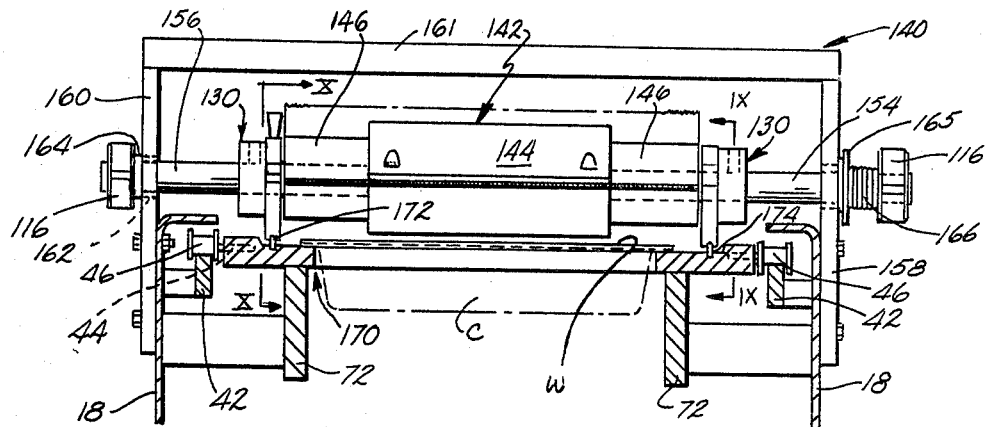
FIG. 8 is a sectional, end elevation of the cutting assembly area of a second embodiment of the packaging machine taken along a plane similar to that of FIG. 6.

Referring now to the drawings in greater detail, FIGS. 1 and 2 illustrate a packaging machine 10 incorporating the present invention. The packaging machine is of the type designed for applying and sealing a film or web W of heat sealable material to the top surfaces of a series of open-topped containers C (FIG. 2) supported by a conveyor in the packager 10. The packaging conveyor includes chains 40 supporting a plurality of container supports 60. The conveyor moves beneath a web applying and securing assembly 80 which applies and secures the sealable film W to containers in supports 60. The web is severed between containers by cutting assembly 95 after which the completely sealed containers are removed from the conveyor.

Packager 10 includes a tubular support frame 12 including a plurality of legs 14. The support frame 16 includes a pair of opposed, parallel, aligned conveyor support walls 18 running the length of the machine. Walls 18 are spaced apart by bracing channels 20 or the like and rotatably support a pair of spaced, conveyor support axles 22, 24. Conveyor support axle 22 is at the inlet or insertion end of the packaging machine and is mounted on horizontally adjustable, axle-securing plates 26 which support the axle 22 internally between the walls 18 and are adjustable via exterior bolts 23 as shown in FIGS. 1 and 2. At the outlet or exit end of the packaging machine is axle 24 supported by bearing pillow blocks 28 secured to the exterior of walls 18. Axle 24 is driven by a chain drive assembly including an electric motor 30 and a chain 32 extending around appropriate drive sprockets 34, 36, one being secured to the shaft of the motor and the other on the axle 24. Electrical power is supplied to motor 30 through cable 94 from control box 92 at one side of the packager. A second cable 93 transmits power to heating and sealing roller 90 in assembly 80. A relay may be included between cable 94 and motor 30 to sense the temperature of roller 90 and allow conveyor operation only when roller 90 is sufficiently hot to properly seal web W to the containers.

A spaced pair of chain support sprockets 38 is mounted on each axle 22, 24 adjacent the interior of walls 18 such that longitudinally spaced pairs of the sprockets on the two axles are aligned. Each longitudinally spaced pair of sprockets supports an endless conveyor chain 40 therearound (FIGS. 1–4). Intermediate the aligned pairs of sprockets, chains 40 are supported by chain support bars 42 secured adjacent the top and bottom edges of the conveyor support walls 18. Conveyor chains 40 each include inwardly extending pivot pins 44 (FIGS. 3–5) which extend through spaced pairs of chain side links 45 (FIGS. 5 and 6) as well as pivotally interconnecting the adjacent chain links. Pins 44 extend inwardly a distance equivalent to the distance between the chain side links. Each pair of chain pins 44 together with a pair of chain links 45 forms an opening internally of the chain which receives a tooth on the drive sprockets 38 in the same manner that a bicycle chain is received on a sprocket in a bicycle. Chain pins 44 extend inwardly from each chain and are transversely aligned and coaxial with one another when mounted on sprockets 38. Between each pair of chain side links 45 is a spacing roller 46 (FIG. 6) which freely rotates about the portion of chain pin 44 between the side links. Rollers 46 are supported by chain support bars 42 which in turn are secured to but spaced from the interior surfaces of conveyor support walls 18 (FIG. 6). Accordingly, chains 40 are known as roller chains but also include inwardly extending pivot pins at each pivot joint of the chain.

Container support plates 60 are designed to be supported by spaced pairs of the inwardly extending chain pins 44 from chains 40 at intervals along the chains. As best seen in FIGS. 1, 3, 6 and 7, each container support plate 60 is generally rectangular and includes a generally flat or planar body section 62 having a length slightly less than the distance between the ends of the inwardly extending chain pins 44 as defined by parallel end surfaces 64. The width of the plate 60 is determined by the size of the aperture 66 formed within body 62 for receipt of an open-topped, rimmed, formed thermoplastic container C to be seated therein. The flat, planar portion of body 62 around aperture 66 firmly supports the rim of a container (FIG. 6) to allow for film pressure of the sealing web W thereagainst during the sealing process.

Adjacent either end edge 64 of plates 60 is a raised flange 68 (FIGS. 3, 5 and 6). Formed integrally with flanges 68 are spaced, parallel projections 70 which extend outwardly from the end edges 64 and include chain pin-receiving apertures 71 (FIGS. 6 and 7) which are slightly larger than the pins themselves. As shown in FIG. 3, apertures 71 in projections 70 are spaced apart a predetermined distance A corresponding to the distance between every fourth chain pin 44 in the preferred embodiment. Pins 44 are received in apertures 71 with pins 44 on either side of those in apertures 71 received in the open spaces adjacent the projections 70 for clearance. The overall length of the container supports 60 between the end surfaces of projections 70 is slightly less than the distance between the innermost chain side links 45 of the opposing chains 40 as is best seen in FIGS. 3, 5 and 6. When mounted on the chains 40 as above, a space of predetermined width exists between the side edges of the adjacent plates (FIGS. 3 and 5). The chain pins fully support the plates such that they may be carried around the drive sprockets 38 as shown in FIG. 1.

In the area beneath the web applying and sealing assembly 80 as well as under the cutting assembly 95, two additional, spaced container plate support bars 72 are secured to but spaced inwardly from the internal surfaces of walls 18 beneath the conveyor (FIGS. 1, 2 and 6). The top surfaces of container support bars 72 slidingly support plates 60 and resist the downward pressure exerted against the support plates by the heating and sealing roller 90 (described hereinafter) against the upper surfaces of the containers and the plates. Bars 72 insure complete, firm attachment of the sealing material to the tops of the containers. Container support plate bars 72 may be adjusted vertically for proper relationship with the bottoms of the container supports via a vertically adjustable, bolted assembly 74 (FIG. 2).

The top surface of body portion 62 of each container support is, in effect, recessed with respect to the top surface of raised flange 68. This enables the pin-receiving apertures 71 in projections 70 to be located such that the pins 44 from the chains will have their top surfaces at approximately the same level as the top surface of container support body 62. Specifically, the vertical position of the top surface of body portions 62 of the container supports is located to move at a linear speed to the circumferential speed of sealing roller 90. This provides sufficient clearance for the rotating cutting edges of cutting assembly 95 to move into and out of the spaces between the plates as will be explained more fully hereinafter.

As shown in FIG. 4, chains 40 will also interchangeably support different sizes of container support plates such as those shown at 60a in FIG. 4. Container supports 60a are similar in all respects to container supports 60 except that apertures 66a are of a different size and shape and the overall width of the container supports is less than those of container supports 60. However, the spacing between the pin-receiving apertures in the end surfaces of container supports 60a is the same as those for container supports 60 meaning that they can be telescopically received on the integrally extending chain pins 44, i.e., every fourth pin, in the same manner as described above in connection with FIGS. 3 and 5. Further, the spacing between container supports 60a is less than that between container supports 60 although the cutting assembly 95 will operate successfully without adjustment over a range of spacings between the plates including the spacings described for both plates 60 and 60a. In a like manner container support plates, which are wider than plates 60, can be interchangeably mounted on chains 40 without need for adjusting cutting assembly 95.

In the area designated by arrows III in FIG. 2, which is the area of the conveyor immediately upstream from web applying and sealing assembly 80 and shown in FIG. 3, chains 40 may be lifted off support bars 42 and moved or flexed laterally outwardly toward the interior surfaces of walls 18 to remove pins 44 from their corresponding apertures in plates 60 or 60a and to remove the plates from the conveyor. This simple method enables the container support plates to be interchanged as desired simply by (1) moving the conveyor to bring the plates to the area designated by arrows III, (2) flexing the chain, (3) removing the undesired plates, and (4) inserting the desired plates. The spacing of the apertures is the same in each plate, eliminating any need to change the conveyor chains 40. Moreover, since the conveyor chains have pins at every joint and the conveyor plates are generally uniformly of one width on the conveyor at any one time, the insertion of plates of different widths as described above will vary the spacing between the plates and the number of inwardly extending chain pins between the adjacent apertures on adjacent plates. For narrower plates, therefore, a greater number of plates can be received on the same conveyor chains 40 than with wider plates. For example, in a preferred embodiment, a #40 roller chain having a pitch of ½ inch (i.e., the spacing in inches between the inwardly extending pins or chain joints) is suitable for mounting container support plates at either 3½, 4, 5 or 7 inch cutoff intervals, i.e., 3½, 4, 5 or 7 inch distances between the mid-points of the spaces between the plates. In this example, the width of the plates is 3, 3½, 4⅝, or 6⅝ inches, respectively, while the spacing between the pin-receiving apertures remains the same at approximately 2 inches. The spacing between these respective plates when plates of a uniform size are received on the conveyor is, respectfully, ½, ½, ⅜ or ⅜ inches. However, the cutting assembly 95 as explained hereinafter is well suited to sever the continuous web of material at the mid-point of the space between the plates for any of these spacings without adjustment.

As is best seen in FIGS. 1 and 2, the web applying and sealing assembly 80 is secured over the conveyor at approximately the mid-point of the packager 10. The assembly includes a pair of vertically upwardly extending support bars 82 on opposite sides of the conveyor which are bolted or otherwise secured to conveyor support walls 18. Extending rearwardly or upstream of the conveyor at the top of bars 82 are a pair of vertically oriented, parallel, aligned web roller support plates 84. The upper edges of these plates are notched to rotatably support a roll 86 of web material such as a heat sealable, thermoplastic film. The roll includes an axle 87 and a length of the web W wound about the axle. Extending forwardly from supports 82 are a pair of vertically oriented side plates 88, one on either side of the conveyor which rest on the top of walls 18 and rotatably support a heating and sealing roller 90. Roller 90 may be pivotally raised and lowered about one end 93 of its support axle out of and into contact with the top surfaces of containers C when they are supported in plates 60 or 60a. Roller 90 is continuously rotated by a sprocket 92 (FIG. 2) fixed to the support axle of the roller, which sprocket engages one of the parallel chains 40 at one end of the roller. As explained below, the pitch diameter of the sprocket which rotates roller 90 is aligned with the horizontal center line of chains 40 for proper operation of the packager. Roller 90 may include a covering of heat resistant rubber or other resilient material 91 on its circumferential surface for pressing and sealing the continuous web W of material against the succession of container top rims.

Referring now to FIGS. 5-7, cutting assembly 95 is shown in detail. The intermittently rotatable cutter includes an elongated, cylindrical cutting blade support member 96 having three equally circumferentially spaced, radially extending, elongated flanges 97 with curved outer or peripheral surfaces. Each of the radially extending, elongated ridges 97 extends outwardly from a common center portion of support 96 and includes an elongated slot 98 formed in the middle thereof and which receives a thin, elongated cutting blade 100. Cutting blades 100 have a width sufficient to extend out of slots 98 when mounted therein and a length longer than the container receiving apertures in the container supports. These blades are retained in the slots by clamping bars 102 (FIG. 7) which are forced against blades 100, which in turn forces the blades against one edge of the slots 98 by set screws 104 threaded into flanges 97 (FIG. 7). Accordingly, when the outer cutting edges of blades 100, which are preferably serrated, become dull, or otherwise damaged, such screws 104 may be loosened and blades 100 easily removed from their clamped position without further disassembly of the cutting assembly 95. This provides a significant savings in time allowing rapid substitution of sharpened blades when necessary.

It has been found that three, equally circumferentially spaced, blades or edges on support 96 provides best results in the invention. Two blades 180° apart would not allow proper cutting between each adjacent pair of supports 60 or 60a. Four or more blades requires a much larger diameter support than support 96.

Cutting blade support member 96 is fixedly secured to a pair of coaxial stub shafts 106, 108 by roll pins 105 or the like such that it is rotational therewith. Stub shafts 106, 108 are in turn rotatably supported immediately downstream of assembly 80 by bearing support bars 110, 112 which are bolted to conveyor support walls 18 on opposite sides of the conveyor. Bars 110, 112 include elongated openings through which the bolts extend and which allow vertical adjustment of the position of shafts 106, 108 and, thus, cutting blade support 96 and blades 100. This allows adjustment of the vertical distance between the axis of stub shafts 106, 108 and the top surfaces of the container support. This, in turn, provides clearance for entry and exit of the blades 100. Stub shafts 106, 108 extend through suitably sized apertures in bars 110, 112 which in turn receive lubricious bushings 114 through which the stub shafts extend. Bushings 114 are held in place by removable collars 116 secured to the stub shafts. Shaft 106 is somewhat longer than shaft 108 and also includes a bronze bushing 118 telescoped over its end outside bar 110 and collar 116.

Bushing 118 is secured by a coil spring 119 to bar 110 or support wall 118 to urge bushing 118 against shaft 106. The frictional interengagement between bushing 118 and shaft 106 resists rotation of the cutting blade support member 96 and blades 100 and prevents "freewheeling" of the assembly except when positively engaged by the upwardly extending pin 135 from a container support plate 60 or 60a engaging camming member 130 as described hereinafter.

Adjacent one end of cutting blade support member 96 is secured a cylindrical camming member 130 (FIGS. 5–7) in a fixed position on shaft 106 by a pair of set screws or the like. Camming member 130 includes a central, cylindrical support 132 having a central aperture therethrough on its cylindrical axis through which shaft 106 is received. Extending radially outwardly at three equally, circumferentially spaced positions around support 132 are radial camming projections 134. Each camming projection 134 has a length sufficient to extend close to the top surface of one of the container support plates 60 and 60a such that it can be engaged by an upwardly extending projection pin 135 secured in the container support plate. As will be seen from FIGS. 5 and 7, camming projections 134 are offset downstream of their respective cutting blades 100 such that when engaged by pins 135, the camming projections will cause rotation of the cutting blade support member on shafts 106, 108 and against the resistance of bushing 118 to swing the blade 100 which is immediately upstream of that camming projection into the space between the adjacent container support plates. This severs the entire width of the web material which has been previously secured to the containers.

As mentioned above, each of the container support plates 60, 60a or the like includes a single, upwardly projecting pin 135 adjacent the upstream side edge of the plate on the side on which the camming member 130 is located. Pins 135 are force fitted into corresponding bores in the upper surfaces of the support plates such that they project perpendicularly upwardly from the top surface of each plate a distance sufficient to engage one of the camming projections 134 of camming member 130. The lateral position of each pin is such that it can make that engagement. As shown in FIG. 7, as the conveyor moves the container support plates forwardly, the single pin 135 on each of the container support plates engages the rear surface of one of the camming projections 134 with its leading edge surface and causes rotation of the cutting blade support member 96 in the same direction in which the conveyor is moving (counterclockwise in FIG. 7). That engagement and rotation swings and rotates the cutting blade 100, which is immediately upstream from the camming projection engaged by pin 135, into the space between the plates. The distance from the center line of the space between the plates to the leading edge of the pin 135 which contacts camming projection 134 (dimension B in FIG. 7) is such that blade 100 will be extending vertically downwardly beneath the axis or center line of shafts 106, 108 at the exact time that the center line of the space between plates 60 is aligned with the axis or center line of shafts 106, 108. This insures proper severance of the sealing web between the plates and yet provides sufficient clearance for the blade to move into the space and out again as the plates continue to move along the conveyor. In addition, cutting blades 100 aid rotation of cutting blade support member 96. Pin 135 moves camming projection 134, and thus support member 96, until blade 100 is nearly completely out of the space between two adjacent container support plates. Blades 100 lightly brush against the upper corner of the leading edge of the following container support plate to complete rotation of member 96 and blade 100 out of that space and to help position the next camming projection 134 for engagement by the next pin 135.

After web W is secured to the rims of the supported containers and severed with the cutter, the containers are raised out of the supports by sliding engagement with inclined lifting rails or members 120 (FIGS. 1 and 5). The undersides of the rims slide along inclined rails 122 secured above the outlet end of the conveyor and drop onto platform 124 for removal.

As mentioned above in the specific example, cutoff widths of 3½, 4, 5 and 7 inches measured between center lines of the spaces between the plates are possible using a single #40 chain having pivot pins at one-half inch distances along the chain. Spaces between the plates in this example can vary between ⅝ inches and ¾ inches with the blade 100 being properly swung into and out of the space all without any adjustment of the cutting assembly 95 including both camming member 130 or pins 135. Accordingly, the cutting blade support member 96 is rotated intermittently, i.e., only when one of the pins 135 engages one of the camming projections 134 to rotate the next adjacent cutting blade 100 into a space between and immediately behind the container support plate 60 or 60a on which the pin which engages this camming projection is mounted.

As shown in FIGS. 5 and 7, the offset of each camming projection 134 from its respective cutting blade 100 is adjusted when the cutting blade support 96 and cutting assembly 95 are first mounted on the packaging machine. The relationship is such that the blade 100 will be extending exactly vertically, downwardly and is centered in the space between adjacent plates 60 or 60a when the center line of that space between the plates is aligned with the axis of the cutting blade support member 96. That adjustment need not be changed even though the container support members or plates 60 or 60a are changed during use of the packaging machine since the one setting accommodates and positions the blade for cutting for spaces between ⅝ to ¾ inches with a #40 chain. The blade 100 projects outwardly approximately ⅝ inch from the surface of the radially extending flange 97 in the preferred example.

Figure 9:
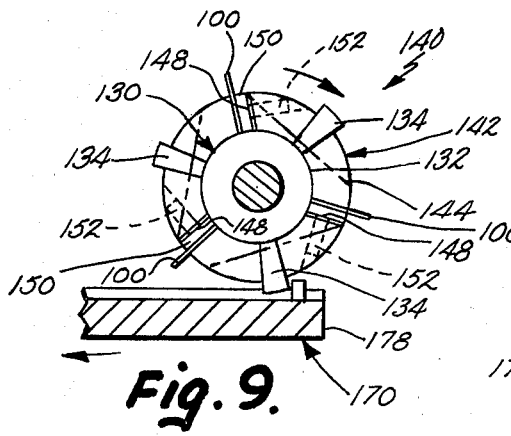
FIG. 9 is a sectional, end elevation of the cutting assembly area of the packaging machine of FIG. 8 taken along plane IX—IX of FIG. 8.
Figure 10:
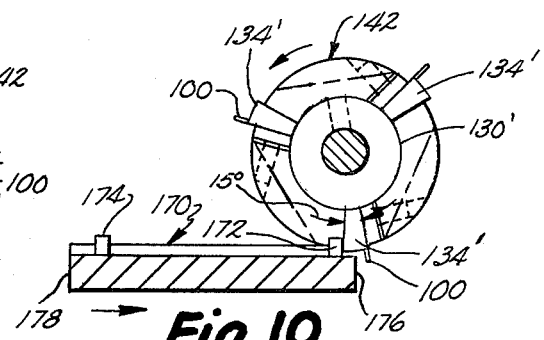
FIG. 10 is a sectional, end elevation of the cutting assembly area of the packaging machine of FIG. 8 taken along plane X—X of FIG. 8.

Referring now to FIGS. 8–10, a modified cutting assembly 140 is shown in detail. Assembly 140 is similar to cutting assembly 95 but includes a pair of camming members 130 and 130', one adjacent either end of the assembly for smoother, more controlled movement of the assembly. Like numerals in FIGS. 8–10 indicate like parts to those in FIGS. 1–7. The intermittently rotatable cutter assembly 140 includes an elongated cylindrical cutting blade support member 142 having two different diameter portions 144, 146. Cylindrical portion 144 is central to the assembly and has a large diameter as seen in FIGS. 9 and 10. Portion 146 has a reduced diameter as compared to section 144 and extends on either end of and is coaxial with central cylindrical portion 144. For clearance over high or upwardly projecting contents of containers, portion 144 may include flat areas intermediate blades 100 as shown in phantom in FIGS. 9 and 10.

As in assembly 95, three elongated slots are included but in central portion 144 at circumferential positions spaced equidistantly therearound. Slots 148 receive the elongated, thin cutting blades 100 which are retained in those slots by clamping bars 150 (FIGS. 9 and 10) which are forced against blades 100. In turn, bars 150 force the blades against the opposite edge of the slots 148 via set screws 152 threaded into the central portion 144. Accordingly, just as in assembly 95, blades 100 may be easily loosened and removed for sharpening or replacement without further disassembly of the assembly 140.

Cutting blade support member 142 is fixedly secured to a pair of coaxial stub shafts 154, 156 by roll pins as in assembly 95. Stub shafts 154, 156 are in turn rotatably supported immediately downstream of assembly 80 by bearing support bars 158, 160 which extend above the stub shafts a significant distance. Bars 158, 160 are secured through elongated holes therein to walls 18 to allow vertical adjustment of the entire cutter assembly. The top of bars 158, 160 are secured together, braced and rigidly supported by a tie bar 161 bolted to their top as shown in FIG. 8. Stub shafts 158, 160 extend through lubricious, cylindrical bearing bushings 162 (FIG. 11) which in turn are received through suitably sized apertures in bars 158, 160. Bushing 162 on shaft 156 is held in place by a clamp collar 164 press fitted or otherwise secured to the stub shaft. A securing collar 116 is fixed to the end of shaft 156 by a set screw beyond collar 164. Shaft 154, however, is somewhat longer than shaft 156 and includes a rotation resisting brake structure to prevent free-wheeling of the shaft, and thus the entire cutter assembly, between engagement of projections with the camming members as described below. The braking assembly includes a flat, metallic washer 165 urged against abutment or clamp collar 164 by means of a biasing coil spring 166 held on shaft 154 by another collar 116. Thus, since spring 166 is compressed between collar 116 and washer 165, the force of spring 166 bearing against collar 116 and washer 165 which is urged against collar 164 resists movement of shaft 156 and the cutter assembly to which it is secured. This resistance force is sufficient to prevent the cutter assembly from freely rotating or "free-wheeling" between movements caused by the camming means.

Adjacent the right hand side of cutting assembly 140, as seen in FIG. 8, is a cylindrical camming member 130 identical to that shown in assembly 95 in FIGS. 5–7. Member 130 is secured in a fixed position on shaft 154 by a pair of set screws 131 or the like as seen in FIG. 11.

As shown in FIGS. 8 and 10, a second camming member 130' is included at the opposite end of cutting assembly 140. Camming member 130' is also exactly similar to camming member 130 but is fitted at the opposite end and includes radial camming projections 134' which are offset at different positions around the circumference of shaft 156 from the positions of projection members 134 with respect to shaft 154. As shown in FIG. 10, the downstream surfaces of camming projections of 134' are set flush with the downstream surfaces of cutting blades 100. Inasmuch as there is an approximate 15° angle between the two surfaces of projections 134' as shown in FIG. 10, the upstream surface which is engaged by a camming projection from a container support member is approximately 15° upstream from blade 100.

Cutting assembly 140, including camming members 130 and 130' on opposite ends, is designed for use with container support members 170 which are the same as container support plates 60, 60a, or support member 180 described below except for the inclusion of a pair of upstanding projections or pins 172, 174. As shown in FIGS. 8–10, projection or pin 172 is embedded perpendicular to the container support surface of support member 170 adjacent the flange which receives the container support pins from the chains on one side of the conveyor and immediately adjacent the leading edge 176 of container support member 170. Projection or pin 174 is located diagonally across the container support member adjacent the rear edge 178 of support member 170 and also near the opposite pin-receiving flange of the member. Pin 172 engages projections 134' on camming member 130 to rotate cutting blades 100, each of which is immediately downstream of one projection 134', out of the space between container support plate 70 and the next adjacent downstream container support plate after the blade 100 has severed the web between the two plates. Such engagement and rotation of the cutting assembly presets the blades 100 such that the two lowermost blades are approximately equidistant from the container support surface of container 170 as shown in FIG. 9 and readies the cutting assembly and camming member 130 for engagement by pin 174 on the diagonally opposite corner of the container support member 170. Thereafter, pin or projection 174 engages the upstream surface of camming member 134 immediately downstream of the next cutting blade 100 which will be brought into a space between container support member 170 and the next adjacent container support member to sever the web between those two support members. The engagement between projection 174 and camming member 134 rotates the cutting assembly and as pin 174 passes out of engagement with that camming member it leaves the cutting assembly in a position such that the next camming member 134' on the opposite end of the cutting assembly will be engaged by the leading projection or pin 172 on the next upstream container support member to further rotate the cutting assembly 140. This procedure presets the cutting roller and allows the trailing projection or pin 174 to smoothly and evenly engage the camming projection 134 for proper cutting between the next two adjacent support members without jamming or interruption. Inasmuch as the blades 100 may still project downwardly partially into the slot between two container support members after pin 172 is out of engagement with the upstream surface of projection of camming projection 134', the leading edge corner of each container support member may lightly brush against the upstream surface of blade 100 and rotate assembly 140 slightly more as was described above in connection with assembly 95.

Figures 12, 13:
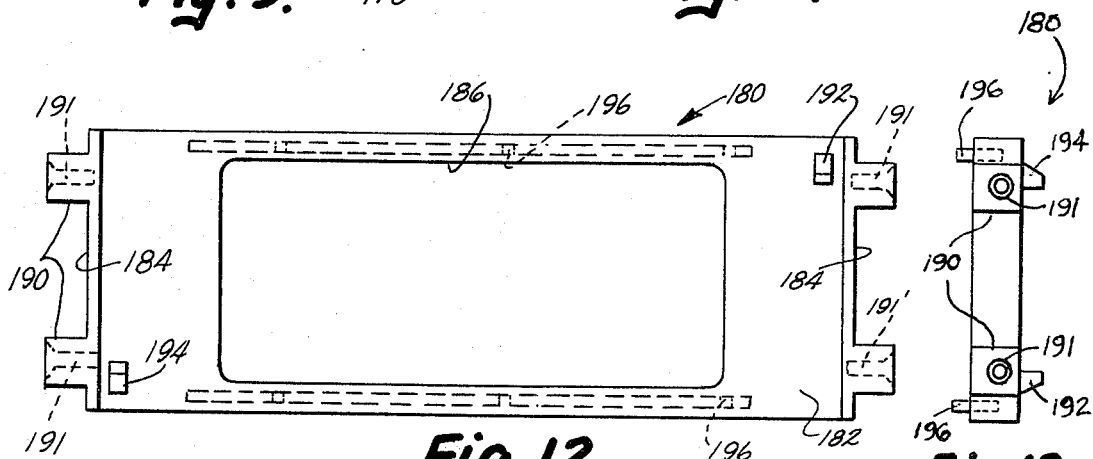
FIG. 12 is a top view of a molded container support member of the present invention.
FIG. 13 is an end view of the container support member shown in FIG. 11.
Figure 14:
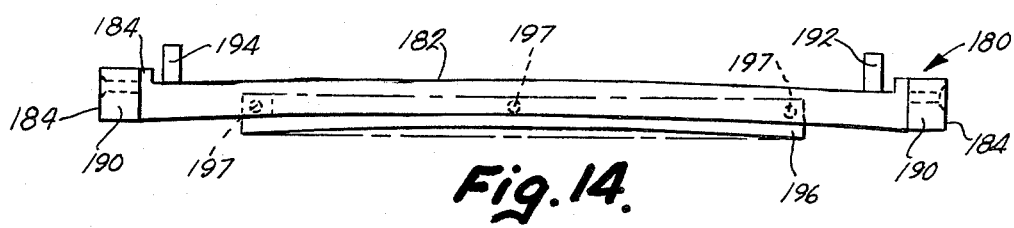
FIG. 14 is a side elevation of the container support member of FIGS. 12 and 13.

As shown in FIGS. 12–14 another embodiment 180 of a container support member is shown. Embodiment 180 is molded from a moldable, settable material, preferably a resinous plastic such as 30% glass filled nylon. Each container support 180 is generally rectangular and includes a body section 182 having a length slightly greater than the distance between the ends of the inwardly extending chain pins 44 as defined by the parallel end surfaces 184. The width of support 180 is determined by the size of aperture 186 formed within body 182 for receipt of an open-topped, rimed, formed thermoplastic or paper container C to be seated therein (FIG. 8). Just as in the case of plates 60, 60a, and 170 raised flanges 188 are included on either end and include spaced, parallel projections 190 which extend outwardly from end edges 184 and include chain pin-receiving apertures 191 which are slightly larger than the chain pins 44. Apertures 191 are countersunk for ease in pin insertion. The areas between and on either side of projections 190 provide clearance for pins not received in apertures 191 just as in supports 80, 60a and 170. Also included on the top surface of support 180 are diagonally opposite camming member engaging projections 192, 194. Projections, 192, 194 taper from a broad base to a narrower top section as shown in FIG. 13 to provide strength. Each of the projections is tapered inwardly so that the container support member is reversible between the chains, i.e., either projection could be the leading or trailing projection.

As is evident from FIG. 14, the entire body portion 182 of support 180 is curved or bowed such that the top surface is convex and the bottom surface is concave. Such curvature is necessary inasmuch as the moldable, settable material from which support 180 is molded is somewhat flexible. The upward curvature allows the support to flex downwardly to a planar position under the pressure of the web applying and sealing assembly 80 and especially heating and sealing roller 90 described above. Thus, the secure, continuous seal around the entire rim of a container supported by support 180 is assured even though the molded material from which support 180 is made would normally flex.

To enhance the rigidity and resistance to flexure of the moldable material, a pair of elongated aluminum bars 196 are embedded in the bottom surface of the container support along the longer sides of the container receiving aperture 186. These bars include apertures 197 therethrough which are filled with moldable material during the molding process and retain the bars in place. Preferably, the supports are molded with the bars 196 therein in a planar orientation. Thereafter, the entire assembly is pressed or bent to impart the curvature or bow shown in FIG. 14. That curvature is exaggerated for purposes of illustration but is typically 0.010 to 0.015 inches at the center line of the support intermediate end surfaces 184 as shown in FIG. 14.

Referring now to FIG. 15 it will be understood that chain pins 44 need not extend inwardly from each joint of conveyor chains 40 in order to interchangeably support four different sizes of container support members at the standard cutoff intervals of $3\frac{1}{2}$, 4, 5 and 7 inches. In the preferred embodiment, each chain 40 is formed from #40 pitch chain having a pitch length of $\frac{1}{2}$ inch and a total number of 280 pitches. It has been discovered that locating the pins at the joints of the chain at the location of the X's in FIG. 15 in each half of each chain provides the ability to interchangeably support at evenly spaced locations all four sizes of container support members, namely, 3, $3\frac{1}{2}$, $4\frac{5}{8}$, or $6\frac{5}{8}$ inch wide container supports, within a chain having 280 pitches as described above. Such location of the pins at a majority of the joints provides sufficient double pin locations spaced apart by four pitch lengths or 2 inches to evenly receive each size of container support member along each chain. Although the pin spacing carrying the various sizes of container supports remains constant, the same pins are not used to support the different sizes of supports. For the 3 and $4\frac{5}{8}$ inches sizes, i.e., cutoff lengths of $3\frac{1}{2}$ and 5 inches (FIG. 15), the container supports are received evenly in each half of each chain. Thus, the pins are located in a pattern which repeats itself in each half of each chain, i.e., once every 140 pitches as shown in FIG. 15. For the $3\frac{1}{2}$ inch cutoff spacing, 20 container support members in each half of each chain can be received or 40 container support members along and between the entire chains. Similarly, for a 5 inch cutoff, 14 supports can be evenly received in each one-half chain or 28 along the entire chains. For a 4 inch cutoff, 35 container support members can be received evenly along the entire chains, and 20 along the entire chains for a 7 inch cutoff. Such pin spacing, although seemingly complex and irregular, repeats each 140 pitches and eliminates 62 pins which otherwise would be included on a chain including inwardly extending pins at each joint. Thus, the expense of the extra pins in the chains may be saved.

Accordingly, the present invention provides the ability to interchange container support plates to accommodate differing sizes of containers. The packager automatically compensates to cut the continuous web of material intermediate various sizes of such plates without adjustment or time consuming modifications. The cutting assembly itself is simple and reliable while the blades in the cutting assembly are easily removable for repair or replacement.

While several forms of the invention have been shown and described, other forms will now be apparent to those skilled in the art. Therefore, it will be understood that the embodiments shown in the drawings and described above are merely for illustrative purposes, and are not intended to limit the scope of the invention which is defined by the claims which follow.

The embodiments of the invention in which an exclusive property or privilege is claimed are defined as follows:

1. A packaging machine for applying and securing a web of material to containers comprising:
    conveyor means for supporting and conveying containers in one direction along a path, said conveyor means including a plurality of spaced container support members mounted thereon;
    web applying and securing means for applying and securing a continuous web of material to the containers supported by said conveyor means; and
    cutting means for separating said web of material intermediate said container support members; said cutting means including a rotatable cutter having two ends and at least three cutting edges equally spaced in fixed positions around the exterior thereof and extending across said conveyor means, support means for rotatably supporting said cutter transversely across and above said conveyor means, said support means including camming means at each of said two ends of said cutter for intermittently rotating said cutter in a circular path, said camming means being offset circumferentially from said cutting edges; said container support members each including at least two projecting means for engaging said camming means, at least one projecting means being aligned with one of said two camming means and at least the other projecting means aligned with the other of said two camming means whereby said cutter is intermittently rotated such that said cutting edges are rotated to a first position by said one projecting means engaging said one camming means and thereafter rotated through a second position between said container support members to sever said web of material therebetween by said other projecting means aligned with the other of said two camming means.

2. The packaging machine of claim 1 including means for adjustably securing each of said two camming means to said rotatable cutter such that the position of each of said camming means may be adjusted to properly intermittently rotate said cutter and cutting edges with respect to said container supports.

3. The packaging machine of claim 1 wherein said support means include shaft means secured to said rotatable cutter for suspending said cutter over said conveyor means, bearing support means for rotatably supporting said shaft means; said camming means being respectively secured to said shaft means adjacent the opposite ends of said cutter.

4. The packaging means of claim 3 wherein each of said camming means include a cam support adjacent one end of said rotatable cutter having an aperture therethrough with said shaft means telescoped through said aperture and secured therein and at least three camming projections extending radially outwardly of said cam support, each camming projection having a length sufficient to extend adjacent the top surface of one of said container support members, said cam support positioned on said shaft such that said camming projections are offset circumferentially from said blades so as to engage said projection means on one of said container support members and rotate one of said blades between said one container support member and the next adjacent container support member.

5. The packaging machine of claim 3 including means on said shaft means for resisting rotation of said cutter to prevent mispositioning thereof by free-wheeling after engagement by said projecting means.

6. The packaging machine of claim 5 wherein said means on said shaft means for resisting rotation of said cutter include an abutment on said shaft having an aperture through which said shaft means passes, engaging means for engaging said abutment, biasing means for urging said engaging means against said abutment, and means for retaining said biasing means on said shaft.

7. The packaging machine of claim 3 wherein said support means for said cutter include a pair of upstanding supports including said bearing support means, one on either side of said conveyor means, and rigid means extending between said upstanding supports for rigidifying said support structure.

8. The packaging machine of claim 1 wherein each of said camming means include a camming projection adjacent but offset circumferentially from each of said cutting edges whereby said camming projections will successively engage said projection means on said container support members and rotate said cutter and said cutting edges successively between said container support members to sever said web of material.

9. The packaging machine of claim 1 wherein each of said container supports has a predetermined width and length, front and rear edges, end surfaces, and a container receiving aperture therethrough; one of said projecting means being adjacent said front edge and one end of said container support, and the other of said projecting means being adjacent said rear edge and the other end of said container support.

10. Cutting apparatus in a packaging machine of the type adapted for applying and securing a web of material to a container comprising:
a rotatable cutter having two ends and at least three equally circumferentially spaced cutting edges in fixed positions thereon;
a conveyor having spaced container supports thereon which are adapted to support containers to which a continuous web of material is adapted to be applied and secured; support means for rotatably supporting said cutter immediately adjacent said conveyor;
a pair of camming means cooperating with said cutter for intermittently rotating said cutter, one camming means adjacent each end of said cutter, each of said camming means including a camming projection of each of said cutting edges, each of said camming projections being offset circumferentially from its respective cutting edge;
projection means projecting outwardly from said container supports for cooperation with said camming projections, a pair of said projection means being located on each of the container supports, one projection means being aligned with one of said camming means and the other projection means aligned with the other camming means, whereby said camming projections are successively engaged by said projection means during operation of the conveyor for intermittent rotation of said cutter such that said cutting edges will rotate through the plane of the web material to sever the material between adjacent ones of said container supports.

11. A container support for use with a packaging machine adapted to apply a web of covering the material to an open-topped container supported by said support comprising a body having a top container support surface, a bottom surface, front, rear and opposing end edges, and a container receiving aperture extending therethrough; means for supporting said container support intermediate a pair of parallel conveying means for carrying said support; at least one projecting means projecting outwardly from said body for engagement with a web severing device; said body being molded from a settable material and being curved such that said top surface is convex and said bottom surface is concave whereby said support will flex to allow proper container sealing when pressure from a web applying device is applied to said top surface.

12. The container support of claim 11 wherein each end surface of said support body includes means for receiving support pins for carrying said support.

13. The container support of claim 12 wherein each end surface of said support body also includes means providing clearance for support pins not received in said means for receiving said support pins.

14. The container support of claim 11 wherein said support body includes a pair of said projecting means, one of said projecting means being adjacent said front edge and one end of said container support, and the other of said projecting means being adjacent said rear edge and the other end of said container support.

* * * * *

UNITED STATES PATENT AND TRADEMARK OFFICE
CERTIFICATE OF CORRECTION

PATENT NO. : 4,296,589
DATED : October 27, 1981
INVENTOR(S) : Gary L. Kruse

It is certified that error appears in the above—identified patent and that said Letters Patent is hereby corrected as shown below:

Column 6, line 6:

"film" should be --firm--

Column 9, line 21:

"and" should be --or--

Column 16, Claim 10, line 15 & 16:

"projection of" should be --projection for--

Signed and Sealed this

Thirtieth Day of March 1982

[SEAL]

Attest:

Attesting Officer

GERALD J. MOSSINGHOFF
Commissioner of Patents and Trademarks

UNITED STATES PATENT AND TRADEMARK OFFICE
CERTIFICATE OF CORRECTION

PATENT NO. : 4,296,589
DATED : October 27, 1981
INVENTOR(S) : Gary L. Kruse

It is certified that error appears in the above—identified patent and that said Letters Patent is hereby corrected as shown below:

Colume 3, line 30:

"support" should be --supports--

Colume 11, line 17:

"top" should be --tops--

Colume 13, line 5:

after "projections" delete --,--

Colume 13, line 62:

"repeates" should be --repeats--

Colume 14, line 6:

"repeates" should be --repeats--

Colume 16, line 34: delete "the".

Signed and Sealed this

Fourth Day of May 1982

[SEAL]

Attest:

GERALD J. MOSSINGHOFF

Attesting Officer    Commissioner of Patents and Trademarks